United States Patent
Mohamed (10) Patent No.: US 11,811,770 B2
(45) Date of Patent: Nov. 7, 2023

(54) SYSTEMS AND METHODS FOR DATA ACCESS NOTIFICATION ALERTS

(71) Applicant: PayPal, Inc., San Jose, CA (US)

(72) Inventor: Riaz Ebrahim Mohamed, Singapore (SG)

(73) Assignee: PayPal, Inc., San Jose, CA (US)

( * ) Notice: Subject to any disclaimer, the term of this patent is extended or adjusted under 35 U.S.C. 154(b) by 68 days.

(21) Appl. No.: 16/917,598

(22) Filed: Jun. 30, 2020

(65) Prior Publication Data

US 2021/0409412 A1 Dec. 30, 2021

(51) Int. Cl.
*H04L 29/06* (2006.01)
*H04L 9/40* (2022.01)
*H04L 51/224* (2022.01)

(52) U.S. Cl.
CPC .......... *H04L 63/101* (2013.01); *H04L 51/224* (2022.05); *H04L 63/0236* (2013.01); *H04L 63/0263* (2013.01)

(58) Field of Classification Search
CPC ..... H04L 63/10; H04L 63/102; H04L 63/105; H04L 63/107; H04L 63/1416; H04L 63/1466; H04L 67/025; H04L 67/306; H04L 41/5096; H04L 63/101; G06F 21/566; G06F 21/6245; G06F 21/6263; G06F 21/564; G06F 21/6218; G06Q 30/00; G06Q 30/0185; G06Q 40/04
See application file for complete search history.

(56) References Cited

U.S. PATENT DOCUMENTS

| | | | |
|---|---|---|---|
| 9,106,691 B1 * | 8/2015 | Burger | H04L 63/1416 |
| 10,237,149 B1 * | 3/2019 | Guo | H04L 67/025 |
| 10,673,905 B1 * | 6/2020 | Chud | H04L 63/107 |
| 10,681,060 B2 * | 6/2020 | Scheidler | G06F 21/566 |
| 10,938,924 B1 * | 3/2021 | Jensen | H04L 41/5096 |
| 2008/0141337 A1 * | 6/2008 | Yeung | H04L 63/102 726/1 |
| 2011/0283336 A1 * | 11/2011 | Lange | H04L 67/306 726/1 |
| 2012/0240236 A1 * | 9/2012 | Wyatt | G06F 21/564 726/25 |
| 2015/0356316 A1 * | 12/2015 | Thompson | G06F 21/6245 726/28 |
| 2016/0132696 A1 * | 5/2016 | Vidhani | G06Q 30/00 726/28 |
| 2017/0155659 A1 * | 6/2017 | Baltar | H04L 63/105 |
| 2017/0358032 A1 * | 12/2017 | Hüffner | G06Q 30/0185 |

(Continued)

FOREIGN PATENT DOCUMENTS

WO WO-2012136652 A1 * 10/2012 ......... G06F 21/6263

*Primary Examiner* — Dustin Nguyen
(74) *Attorney, Agent, or Firm* — Haynes and Boone, LLP (57) ABSTRACT

There are provided systems and methods for a data access notification alert mechanism that monitors for any data access request at a user database of the service provider and sends an electronic notification message to the user when such data access request is detected. Specifically, the data access notification alert mechanism may be implemented with a server, which in turn provides an application programming interface (API) to be integrated with the service provider server, and the API may be called by the service provider database to send a message to the user when a database query to the user information is received at the database.

20 Claims, 7 Drawing Sheets

(56) References Cited

U.S. PATENT DOCUMENTS

| | | | |
|---|---|---|---|
| 2018/0359223 A1* | 12/2018 | Maier | H04L 63/101 |
| 2019/0318122 A1* | 10/2019 | Hockey | H04L 63/102 |
| 2020/0401709 A1* | 12/2020 | Subramanian | H04L 63/10 |
| 2020/0402624 A1* | 12/2020 | Austring | G06Q 40/04 |
| 2021/0084070 A1* | 3/2021 | Dunjic | H04L 63/1466 |
| 2021/0390196 A1* | 12/2021 | Lavine | G06F 21/6218 |

* cited by examiner

SYSTEMS AND METHODS FOR DATA ACCESS NOTIFICATION ALERTS

TECHNICAL FIELD

The present application generally relates to controlling access to a database and more specifically to a data access notification alert system that sends an alert message to a user when private data of the user is being accessed.

BACKGROUND

Various types of service providers may provide online services to users, merchants, other entities, including usage of online platforms to interact with the service provider and other users. These service providers may request an individual user to provider his or her personal data via an online portal in order to obtain online services. For example, the online shopping service AMAZON.COM® usually requires the address information of a user in order for the user to make an online delivery order. For another example, personal transportation service UBER® may require the address, payment, and destination information of the user, and often store the location and travel history of the user. Such private data is typically stored in a secured database server with the service provider. However, once the user has provided his or her private data to the service providers, the user usually has no visibility on how his or her private data will be used by the service provider, or whether the private data may be accessed by an unwanted party. For example, some service provider may share the private user data with another partnering service provider, which the user has no knowledge of. In such cases, the privacy of the user may be violated without user consent.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for a data access notification alert system that sends an alert message to a user when private data of the user is being accessed. Systems suitable for practicing methods of the present disclosure are also provided.

As various service providers may collect user data such as legal names, residential addresses, dates of birth, social security numbers, credit card information, and/or the like, the user may request transparency on how and by whom their private data has been accessed at the service provider. For example, when the user logs into the service provider system via the web service of the service provider, the web service may send an access request to the user database to verify user credentials and retrieve the user profile. In this case, the user would generally consent with the user data access. For another example, when the user is working with a customer service application with the service provider, the customer service application may need to access user data in order to provide service to the user. In this case, the user may likely consent with the user data access. In another example, however, a malicious attacker may hack into the user database at the service provider and retrieve user payment information. In such cases, the user would not consent with the data access and may demand control and protection of their private data.

In view of the need to provide transparency on user data access at a service provider, embodiments described herein provide a data access notification alert mechanism that monitors for any data access request at a user database of the service provider and sends an electronic notification message to the user when such data access request is detected. Specifically, the data access notification alert mechanism may be implemented with a server, which in turn provides an application programming interface (API) to be integrated with the service provider server, and the API may be called by the service provider database to send a message (e.g., a text message, an email, an instant message, etc.) to the user when a database query to the user information is received at the database.

Figure 1:
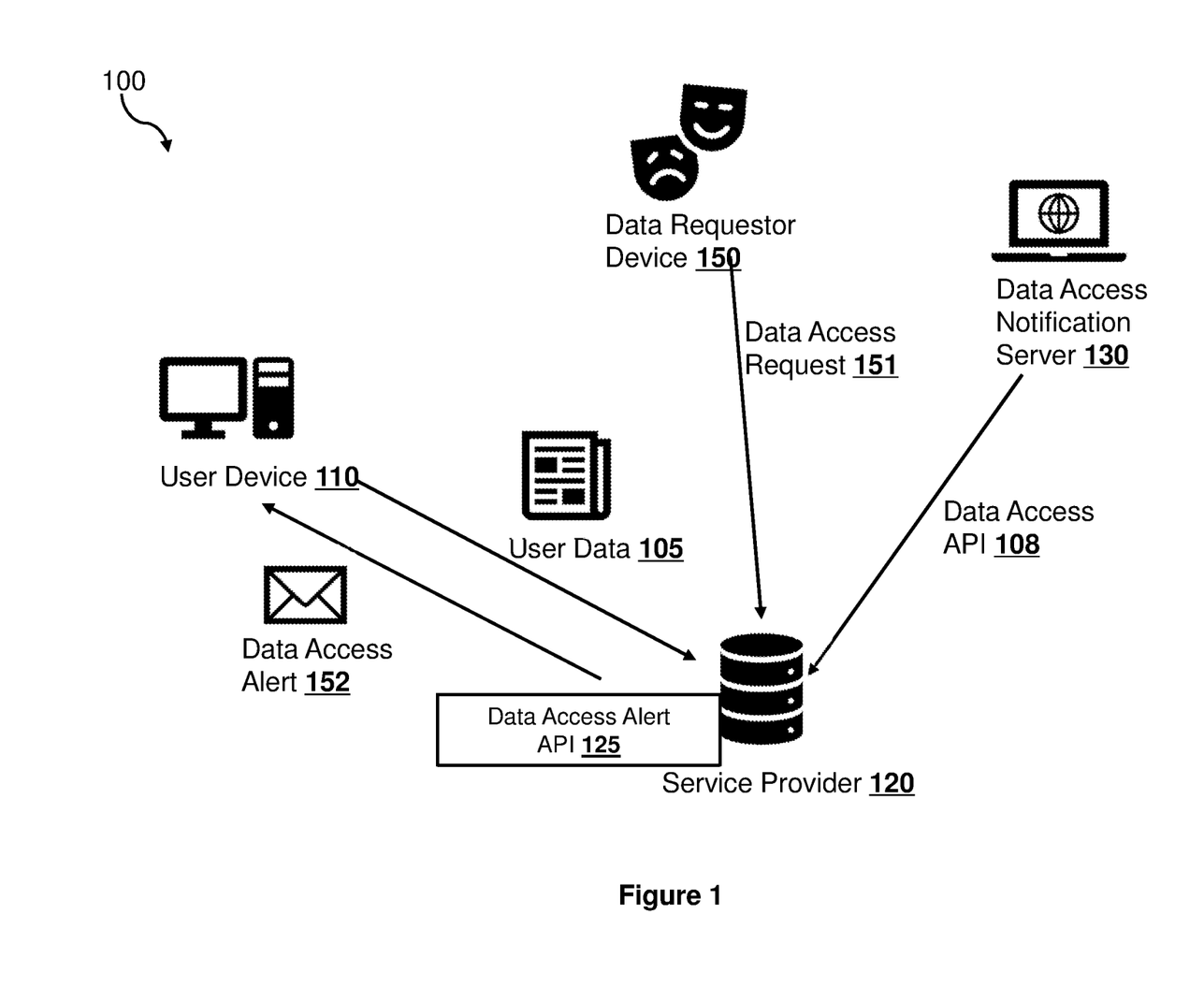
FIG. 1 is a block diagram illustrating example data flows between multiple entities for data access notification alerts, according to one embodiment described herein.

FIG. 1 is a block diagram 100 illustrating example data flows between multiple entities for data access notification alerts, according to one embodiment described herein. Diagram 100 shows a user device 110, a service provider 120, a data access notification server 130, a data requestor device 150, and the interactions therebetween.

The user device 110 may be a computer, a Smartphone, a tablet computer, and/or the like. The user device 110 may be any of an automatic agent that may communicate with another device through a communication network.

The service provider 120 may be a server that may communicate with the data access notification server 130. In one embodiment, the data access notification server 130 may be located remotely to the service provider 120 but may send a data access API 108 to the service provider such that the data access alert API 125 is integrated with the service provider server 120. The data access alert API 125 may be integrated with a database server at the service provider 120 to receive a message whenever the database is being queried for user data.

In one embodiment, a user device 110 may submit user data 105 to a service provider 120. For example, a user may conduct registration with online service, e.g., www.abc-airlines.com, by entering his or her information such as full legal name, passport number, date of birth, credit card information, address information, and/or the like, via a web registration page, which is in turn passed to the server of the service provider 120.

In one embodiment, the user deice 110 may also submit a request for data access alert during the registration with the service provider 120. For example, the online registration form may include an optional question for the user to select as below, e.g., "Do you want to register with Data Access Notification Alert (DANA)?," and provide a selectable widget for the user to choose "Yes" or "No." In some implementations, the service provider web service may further ask the user to specify a communication protocol to receive the notification alert, e.g., via text message at a mobile phone number, via email, via instant message via a user portal with the service provider, via phone call or voicemail, and/or the like. The service provider 120 then receives the user registration request and in turn activates data access notification service for the particular user account.

In one embodiment, the data requestor device 150 may send a data access request 151 to the database at the service provider 120, attempting to access user data. In some implementations, the data access request 151 may include a database query call for one or more user information attributes, such as name, address, phone numbers, etc.

For example, the user device 110 may log into www.abc-airlines.com, and in this case, the database of the service provider 120 may be accessed by the web server of www.abc-airlines.com through an internal API at the service provider 120 to retrieve previously stored user credentials. For another example, a customer service team of "abc-airlines" may access user data associated with the user to provide support, e.g., to verify user identify, to inspect purchase record of the user, etc. For another example, a backup operation of the service provider 120, e.g., a database backup API at www.abc-airlines.com, may access the user data, e.g., to make a backup copy at a cloud service, to recover user record, etc. In another example, the data requestor device 150 may be an attacker, who may take advantage of an authentication/authorization bypass on the service provider 120 server and use the bypass loophole to access the internal API of the service provider to access user data. For another example, the data requestor device 150 may be the marketing team of the service provider 120, who may access user data, e.g., to provide targeted promotion deals based on user past travel history, to send marketing materials to a user email address, etc. In another example, the data requestor device 150 may further include any third-party server that may access user data stored at the service provider 120 without consent or knowledge of the user device 110.

The data access request 151, e.g., a database query call that initiates to access user data at the database server of the service provider 120, may trigger an API call to the data access alert API 125, which may in turn send a notification alert 152 to the user device 110, using a user specified communication protocol, e.g., email, phone call, text message, etc. In some implementations, when a success response from the database at the service provider 120 retrieves private user data from the user database, the data access alert API 125 is initiated. In another implementation, the data access alert API 125 is initiated whenever the database receives an access request, even before a response from the database is issued.

For example, the data access alert API 125 may be a representational state transfer (REST) based API. Example parameters of the data access alert API 125 may include:

```
POST - https://www.DANA-API.com/notification-alert
<Notification_type> email </Notification_type>
<recipient_email> bob@gmail.com </recipient_email>
<reason> DB-backup </reason>
<Access_timestamp> 15-Mar-2020 - 3.30 pm SGT </Access_timestamp>
<Service> abs-airlines </Service>
<Authorization_header> abc-airlines bearer token for authentication with
DANA-API
```

In some implementations, the data access alert API 125 may include, into the alert message, information as to what user information has been requested by the data requestor device 150 and the identity of the data requestor device 150, e.g., "Bob, your phone number and date of birth was accessed by abc-airlines." In some implementations, the data access alert 152 may include a reason for the data access, e.g., "Reason—database-backup." In some implementations, the data access alert 152 may include the access timestamp.

In some implementations, the data access alert 152 may further include a engageable user interface (UI) widget, such as a selectable button, etc., that allows the user device 110 to submit a response via the data access alert 152 to approve or disapprove the data access. For example, when the user device 110 receives a data access alert noting that the database backup operation at "abc-airlines" attempts to access his or her phone number and date of birth, the user device 110 may select a "allow" button provided in the data access alert email to approve the access. In another example, the user device 110 may respond with a text "yes" in response to a data access alert text message.

An example data access alert message 152 in a structural form such as the eXtensible Markup Language (XML) may take a similar form as:

```
<alert>
    <display_text_1>
        "Bob, Your Phone number & DOB was accessed by
        abc-airlines"
    </display_text_1>
    <reason>
        DB-backup
    </reason>
    <timestamp> 15-Mar-2020 - 3.30 pm SGT </timestamp>
    <widget_1>
        <format> selectable button </format>
        <text> "yes" </text>
        ...
    </widget_1>
    <widget_2>
        <format> selectable button </format>
        <text> "no" </text>
        ...
    <widget_2>
    ...
    <display_text_2> "Contact securityincidents@abc-airlines.com if
you believe the access was malicious" </display_text_2>
    ...
</alert>
```

In this way, the user device 110 gets a notification through the data access alert API 125 and displays the notification to a user operating the user device 110 whenever the user's data is being accessed at the service provider 120.

Figure 2:
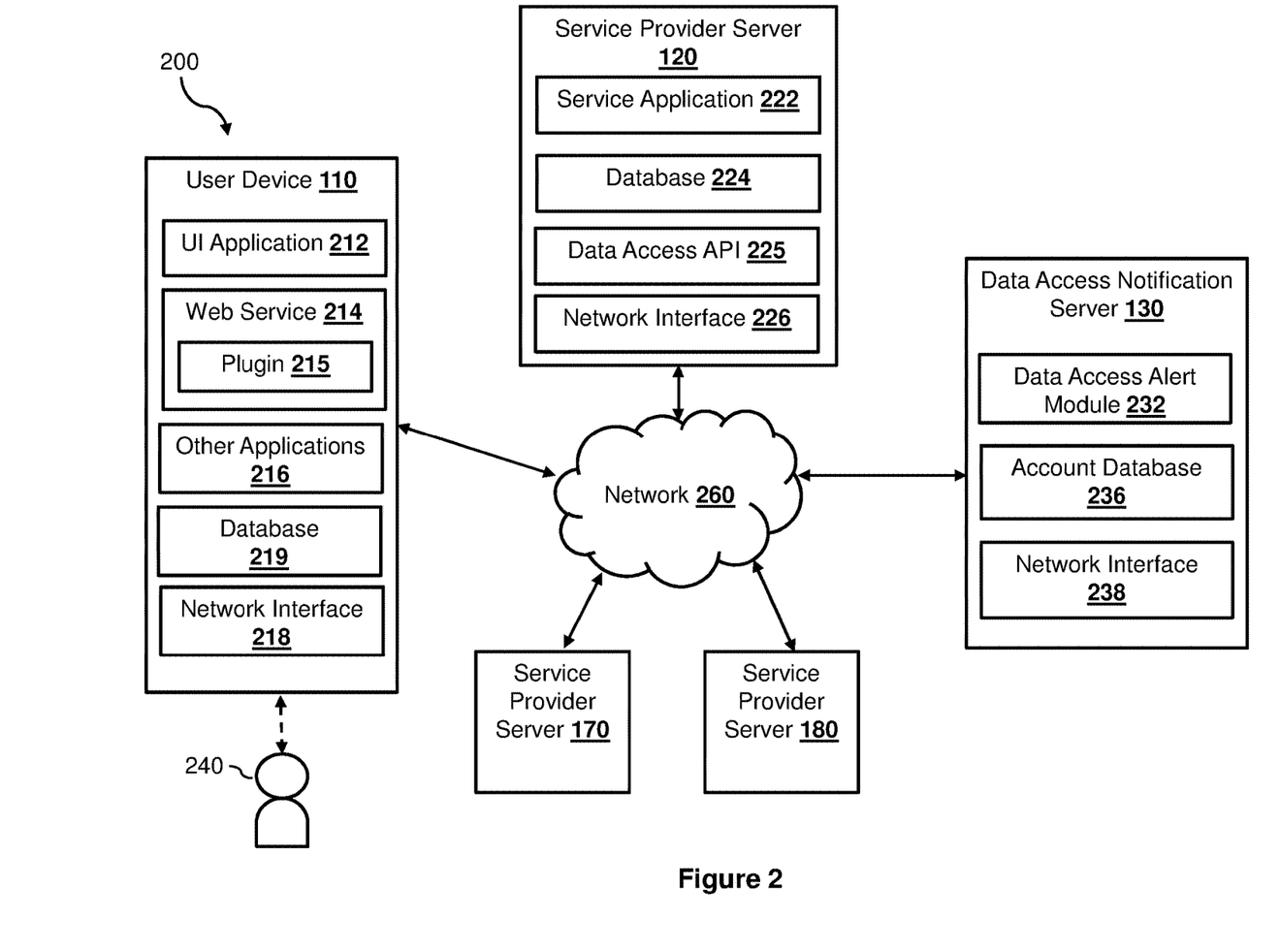
FIG. 2 is a block diagram of a networked system suitable for implementing the processes described in FIG. 1 and other embodiments described herein, according to an embodiment.

FIG. 2 is a block diagram 200 of a networked system suitable for implementing the processes described in FIG. 1 and other embodiments described herein, according to an embodiment.

In one embodiment, block diagram 200 shows a system including the user device 110 (also shown in FIG. 1), service provider server 220 (also shown in FIG. 1), 170 and 180, data access notification server 130 (also shown in FIG. 1), and other forms of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 2 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

The user device 110, service provider servers 220, 270 and 280, and the data access notification server 130 may communicate with each other over a network 260. User device 210 may allow a user to access the various features available for user device 110, which may include processes and/or applications associated with service provider servers 220 to register for service, and/or register for a data access alert service provider by the data access notification server 130.

User device 210, service provider server 120, and data access notification server 130 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system of FIG. 2, and/or accessible over network 260.

User device 210 may be implemented as a communication device that may utilize appropriate hardware and software configured for wired and/or wireless communication with service provider server 120 and/or data access notification server 130. For example, in one embodiment, user device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface application 212, a web service application 214 including an extension plugin 215, and other applications 216, which may correspond to executable processes, procedures, and/or applications with associated hardware. In other embodiments, user device 110 may include additional or different modules having specialized hardware and/or software as required.

The web service application 214 may correspond to one or more processes to execute modules and associated devices of user device 210 to interact with a service provider or other online entity. For example, the web service application 214 may provide user information to the service provider server 120, such as user name, user address, user payment information and/or the like, via the network 260. In this regard, the service application may correspond to specialized hardware and/or software utilized by user device 110 to receive user data, a registration request for data access alert, and/or the like on user device 110.

In some implementations, the web service application 214 and/or the plugin 215 may be used for data tracking associated with a user account through the plugin 215. The account may correspond to an account of a user associated with user device 110 that is provided and maintained by data access notification server 130. The login may be performed by the web service application 214 or the plugin 215 with the service provider server 120.

For example, in order to track data, an online entity may use a piece of data that is stored and functions device-side on the user's device 210 to track the data. In some embodiments, the piece of data may correspond to a web cookie or tracking pixel. For example, a web cookie, such as a hypertext markup language (HTML) cookie, may be placed on the device when the user navigates to a particular webpage of a website of the online entity, and may track user data by recording the user's browsing activity. These web cookies may be used to track navigations by the user, as well as input, such as form filling information. A tracking pixel, such as an HTML pixel, may correspond to a code snippet (e.g., HTML snippet) that is loaded to a user interface of the web browser when the user opens an email or visits a website. This similarly may be used to track user behavior when browsing. In other embodiments, a code snippet, executable process, or native application on the user's device (e.g., a resident dedicated application of a service provider or other online entity, such as a payment, social networking, image sharing, or other application) may track data by accessing stored data in a database or utilizing a device component, such as a GPS or other location sensor, communication module, microphone, camera, or other component.

To prevent data tracking on the user device 110 that may raise privacy concern, the plugin 215, which may be an HTML code or an HTML code snippet that is provided by the data access notification server 130, and installed with the web service 214, may function as an API to be called when a data requestor attempts to access data from the web service 214. Specifically, if this request or attempt is detected on user device 110, the plugin 215 may be used to prevent or completely block data tracking on the user device 110. Alternatively, the plugin 215 may be used to generate an alert message, such as an email, a text message, and/or the like to alert the user that user data on the device is being tracked or accessed.

The web service application 214 may be used to perform actions and/or interactions with service provider server 120, including browsing data and navigating between data, as well as processing electronic transactions and performing other data processing operations. The web service application 214 may correspond to a general browser application configured to retrieve, present, and communicate information over the Internet (e.g., utilize resources on the World Wide Web) or a private network. For example, the web service application 214 may provide a web browser, which may send and receive information over network 260, including retrieving website information, presenting the website information to the user, and/or communicating information to the website. However, in other embodiments, service application 214 may include a dedicated application of the service provider server 120 or other entity (e.g., payment provider, etc.), which may be configured to provide services through the application.

Web service application 214 may generate interaction data with service provider server 120 that indicates a request to register for data access notification, which may be used by the data access API 225 at the service provider server 120. Additionally, the web service application 214 may display messages warning of data access, how much or the type of data access, and/or receiving an indication from the user 240 via the UI application 212 as to whether a data access request is to be approved.

In various embodiments, user device 110 includes other applications 216 as may be desired in particular embodiments to provide features to user device 110. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. Other applications 216 may also include other media viewing applications to consume media content on user device 110. Other applications 216 may further include a tracking application to monitor data usage on the user device 110. Other applications 216 may include device interfaces and other display modules that may receive input and/or output information. For example, other applications 216 may contain software programs, executable by a processor, including a graphical user interface (GUI) configured to provide an interface to the user.

User device 210 may further include database 219 stored in a transitory and/or non-transitory memory of user device 110, which may store various applications and data and be utilized during execution of various modules of user device 110. Database 219 may store data tracking processes and operations, such as cookies or code snippets, which may be stored in database 219 with tracked user and/or device data. In some embodiments, database 219 may be local to user device 110. However, in other embodiments, database 219 may be external to user device 219 and accessible by user device 110, including cloud storage systems and/or databases that are accessible over network 260.

User device 210 includes at least one network interface component 218 adapted to communicate with service provider server 120 and/or data access notification server 130. In various embodiments, network interface component 218 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Service provider server 220 may correspond to an online platform where a user may utilize user device 110 to engage in one or more actions or interactions through an application, such as a web browser application or a dedicated service provider application provided by service provider server 120. For example, service provider server 120 may correspond to an online platform to engage in browsing data, providing user input, and/or navigating between webpages or provided interface data. In this regard, service provider server 120 may correspond to a search engine, email or messaging account provider, social network, microblogging platform, media playback, merchant or payment platform used to purchase one or items, messaging board, or other platform that may wish to track user data through a web cookie, tracking pixel, or operation of an application/process on user device 110. Although service provider server 120 is shown as separate from the data access notification server 130, the two may be combined in some embodiments. Multiple service provider servers such as 270 and 280 may interact with the user device 110 through network 260.

Service provider server 230 of FIG. 2 contains a service provider application 222, database 224 and a data access API 225. The service provider application 222 may correspond to one or more processes to execute software modules and associated specialized hardware of external service provider 220 to provide services to users, for example, when users utilizes an application to interact with one or more services. These services may include a search engine, email or messaging, social networking, microblogging, media playback, shopping or purchasing, or other service. In some embodiments, service provider application 222 may correspond to specialized hardware and/or software to track during and/or after use of service provider application 222, such as data tracked through user device 110. Service provider application 222 may be accessed through a device-side application or another application or a device/server.

In this regard, the other application and/or service provider application 222 may provide data for services and monitor data access requests to the database 224. This may correspond to receiving a registration request for data access notification from the user device 110. The request for data access notification may be transmitted by web service application 214 at the user device through service provider application 222. In response to the request, service provider application 222 may log the request and flag the user data stored at database 224 for monitoring.

Service provider server may include a database 224 used to store user information. For example, the database 224 may store user account and/or profile information such as user name, payment information, address, activity logs with the service application 222, and/or the like. The database 224 may be implemented by one or more relational database, distributed databases, cloud databases, and/or the like. Database 224 may be local to service provider server 220. However, in other embodiments, database 224 may be external to service provider server 220 and accessible by service provider server 220, including cloud storage systems and/or databases that are accessible over network 260.

Service provider server may further integrate a data access API 225, which may be implemented as a REST based API that is configured to communicate with the data access notification server 130.

Data access notification server 130 includes at least one network interface component 226 adapted to communicate with user device 110 and/or data access notification server 130. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data access alert API 225 may, when initiated by an API call when the database 224 is accessed for private user data associated with a user, send an alert message to the user through the network interface 226.

The data access notification server 130 may be housed with, or separately with a transaction processor, which may be maintained, for example, by an online service provider, which may provide online transaction processing services for payment on user device 110, as well as manage payment accounts used to send and receive payments. In this regard, the data access notification server 130 includes one or more processing applications which may be configured to interact with user device 110 and/or external service provider 220 to facilitate transaction processing for purchase of data tracking capabilities on client device 210. In one example, the data access notification server 130 may be hosted by or partnered with a transaction processor that may be provided by PAYPAL®, Inc. of San Jose, Calif., USA. However, in other embodiments, the data access notification server 130 may be maintained by or include another type of service provider, which may provide payment services to a plurality of users.

Data access notification server 230 of FIG. 2 contains a data access alert module 232, a network interface 238, and a database 236. The data access alert module 232 may correspond to executable processes, procedures, and/or applications with associated hardware. In other embodiments, the data access alert module 232 may include additional or different modules having specialized hardware and/or software as required.

The data access alert module 232 may correspond to one or more processes to execute modules and associated specialized hardware to send a data access alert API to the service provider server 120. In some embodiments, the data access alert module 232 may receive a data access request that is captured by the data access API 225 at the service provider server 120, and determine whether to send an electronic alert to the user device 110. In some embodiments, the data access API 225 is called to send the electronic message, and subsequently send information relating to the alert message to the data access alert module 232.

The account database 236 may be stored in a transitory and/or non-transitory memory of the data access notification server 130. In various embodiments, database 236 may include account information, as well as identifiers using in providing and confirming payments for data tracking. For example, the account database 236 may be configured to store payment accounts for a user associated with user device 110 to send and receive payments, the user may provide information, including user personal and/or financial information to the data access notification server 130. Additionally, the information may include authentication information, such as a login, account name, password, PIN, or other account creation information. The user may provide a name, address, social security number, or other personal information necessary to establish an account and/or effectuate payments.

In some embodiments, database 236 may be local to the data access notification server 130. However, in other embodiments, database 236 may be external to the data access notification server 130 and accessible by the data access notification server 130, including cloud storage systems and/or databases that are accessible over network 260.

The data access notification server 130 includes at least one network interface component 238 adapted to communicate with user device 110 and/or service provider server 120, 170 or 180 over network 260. In various embodiments, network interface component 238 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
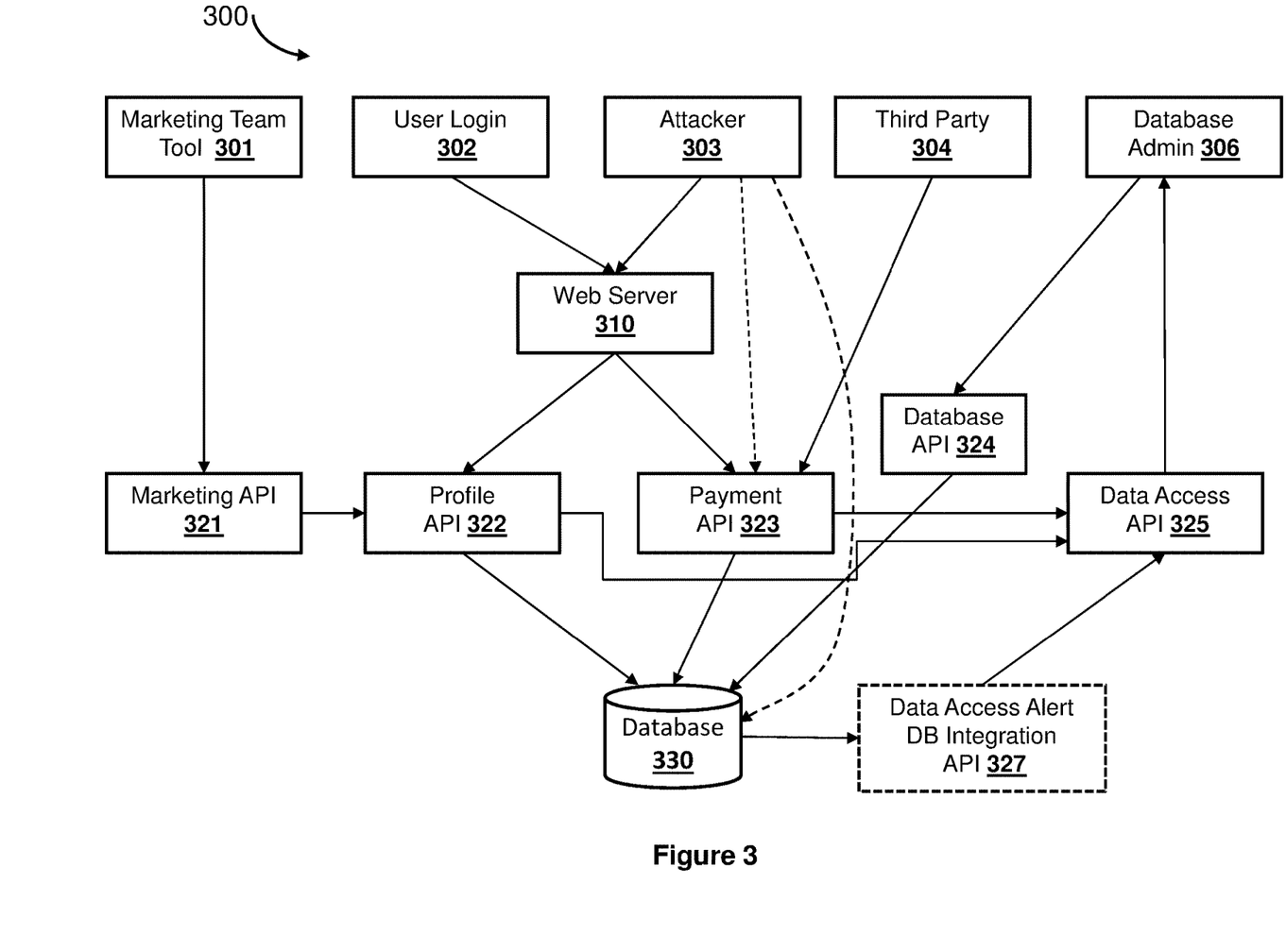
FIG. 3 is a block diagram illustrating an example infrastructure for different data requestors attempting to access user data stored at a service provider, according to one embodiment.

FIG. 3 is a block diagram 300 illustrating an example infrastructure for different data requestors attempting to access user data stored at a service provider, according to one embodiment. As shown in block diagram 300, various different entities 301-306 may send a data access request to user data stored at a service provider. For example, a marketing team tool application 301, a user login event (e.g., through a client service application or a web browser) 302, an unauthorized attacker 303, a third-party service application 304, a database administrator 306, and/or the like may attempt to access user data stored at the database 330 at the service provider server.

For instance, the marketing team tool 301 may send a data access request via the marketing API 321 at the service provider, which may in turn send database queries to the profile API 322 to access user profile data at the database 330.

In another implementation, a user login event 302, e.g., a user may attempt to log into the service provider application through a web service, may trigger a user device (e.g., user device 110 in FIGS. 1-2) to send a data access request for verifying user login credentials to the web server 310, which may in turn send a database query to the profile API 322, and/or the payment API 323 to access user profile data and/or payment data at the database 330.

In another implementation, a third party 304, e.g., a partnering merchant application in which the user may attempt to make a purchase through the service provider application, may send a data access request to the payment API 323, which may in turn send a database query to retrieve payment data from the database 330.

In another implementation, the database administrator 306 may also send a data access request to the database API 324, which may in turn send a database query to the database 330 for database maintenance.

In another implementation, an authorized attacker 303 may send a data access request, e.g., via a web server 310, attempting to log into the service provider application to retrieve payment data associated with the user through the payment API 323. The attacker 303 may also attempt to access the payment API 323 directly by attacking the service provider server directly. The attacker 303 may also attempt to attack the database 330 directly, by sending a fraudulent database query to the database 330 to retrieve sensitive user data.

In some implementations, the profile API 322, and/or the payment API 323 may send information relating to the received data access requests to access user profile data or payment data, respectively, to the data access API 325. In response to all the database queries received at the database 330 for user data, the database 330 may initiate an API call to the data access alert database integration API 327, which may in turn transmit the API call to the data access API 325 to generate an alert message to the user device. In some implementations, the data access API 325 may be optionally deployed separately from the data access alert database integration API 327, as illustrated by the dashed-line box at 327, e.g., for distributed or cloud databases. In another implementation, the data access API 325 and the database integration API 327 may be integrated at the database 330 that is housed with the service provider server.

In some implementation, upon receiving the data access requests from the profile API 322, payment API 323 and/or the like, the data access API 325 may report the data access requests to the database administrator 306. For example, when the data access API 325 is unable to identify an originator or a reason for the data access request or determines that the data access request is from an attacker 303, such data access request may be escalated to the database administrator 306 to take security measures.

Figure 4:
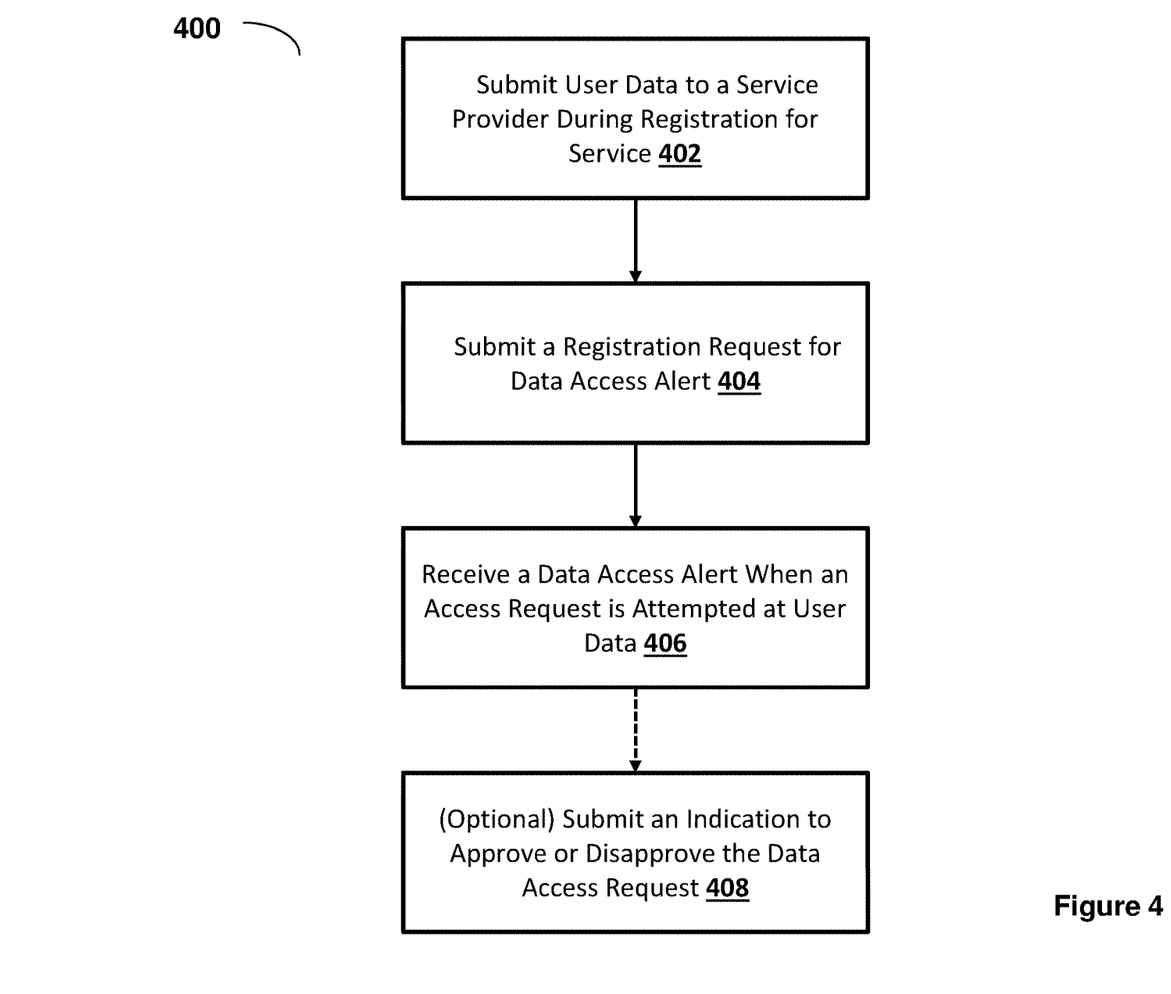
FIG. 4 is a flow diagram of an exemplary process for a user device to register for and receive a data access alert upon registration, according to an embodiment.

FIG. 4 is a flow diagram of an exemplary process for a user device (such as 110 in FIG. 1 or 210 in FIG. 2) to register for and receive a data access alert upon registration, according to an embodiment. One or more of the processes of process 400 may be implemented, at least in part, in the form of executable code stored on non-transitory, tangible, machine-readable media that when run by one or more processors may cause the one or more processors to perform one or more of the processes. In some embodiments, process 400 may be performed by the user device 110 in FIG. 1 or the user device 110 in FIG. 2. It is worth noting that additional processes, steps and/or implementations may be omitted, performed in a different sequence, or combined as desired or appropriate.

Process 400 begins with step 402, where user data may be submitted, by user device 110, to a service provider during the user registration for service. For example, the web service application 214 may correspond to a web browser application on user device 110 in FIG. 2, which may be used to navigate to a webpage of the service provider server 120 that requests the user device 110 to submit user information (e.g., user data 105 in FIG. 1), such as a username, password, address, payment information and/or additional user specified parameters for the service provider. Such information may be provided by a user 240 via the UI application 212 of the user device 110. For instance, a user may access www.abc-airlines.com via a web browser and enter his or her information to register an account with service provider "abc airlines."

At step 404, a registration may be submitted, by user device 110, to the service provider server 120 to register for data access alert. For example, the web service application 214 of the user device 110 may provide a UI widget via the UI application 212 for the user to select "Yes" or "No" to a registration question, e.g., "Do you like to register for data access alerts?" Upon the user selecting "Yes," a registration request is submitted to the service provider.

At step 406, the user device 110 may receive a data access alert when an access request is attempted at user data at the service provider. For example, the user device 110 may receive the data access alert in the format of a text message, an email, a voicemail, an instant message through a service provider application, and/or the like. The user device 110 may then display the received data access alert on a user interface to a user. Further details in generating the data access alert at the service provider are provided in FIG. 5.

At step 408, the user device may optionally submit an indication to approve or disapprove the data access request as shown in the received data access alert message. In some implementation, the data access alert may include a UI widget, such as an email including a selection button that allows a user to select "Yes" or "No" to approve or disapprove the attempted data access. In another example, the data access alert, which may be a text message, may include a text asking the user to respond with "Yes" or "No" to approve or disapprove the attempted data access. The user approval or disapproval may be sent back to the service provider via a communication network.

Figure 5:
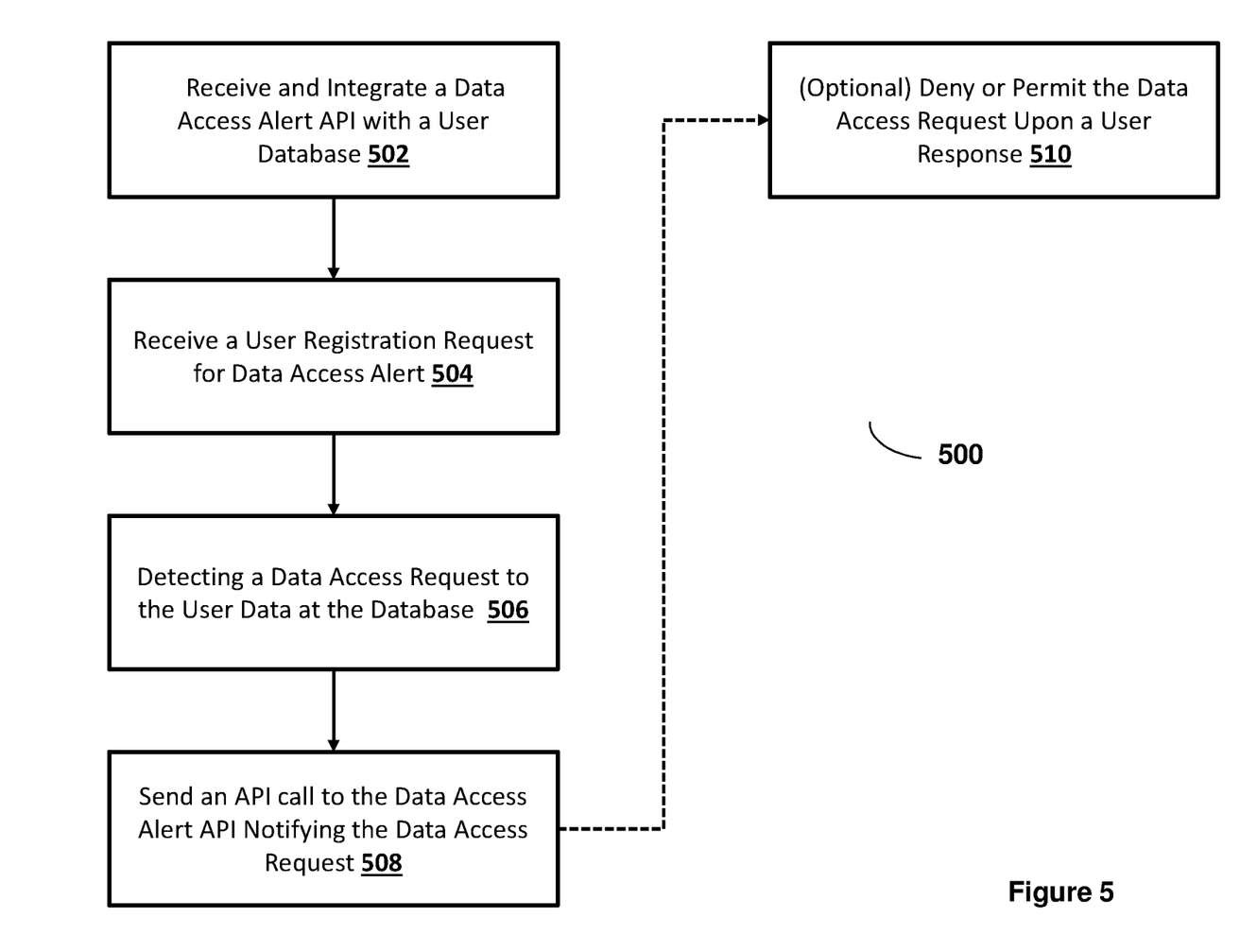
FIG. 5 is a flow diagram of an exemplary process for a service provider to generate and send a data access alert in response to a data access request to user data, according to an embodiment.

FIG. 5 is a flow diagram of an exemplary process for a service provider (such as 120 in FIG. 1 or 220 in FIG. 2) to generate and send a data access alert in response to a data access request to user data, according to an embodiment. One or more of the processes of process 500 may be implemented, at least in part, in the form of executable code stored on non-transitory, tangible, machine-readable media that when run by one or more processors may cause the one or more processors to perform one or more of the processes. In some embodiments, process 500 may be performed by the service provider 120 in FIG. 1 or the service provider server 120 in FIG. 2. It is worth noting that additional processes, steps and/or implementations may be omitted, performed in a different sequence, or combined as desired or appropriate.

At step 502, the service provider may receive and integrate a data access alert API with a database that stores user data at the service provider server. For example, this may include a request to place a code for API, such as REST based API, to implement with a database at the service provider server, e.g., the database server of "abc-airlines. com." The REST based API may comprise a set of codes that are initiated when a database query for user data is received at the database, or initiated when a database response to the database query for user data is generated by the database.

At step 504, the service provider may receive a user registration request for data access alerts. For example, step 504 may be the service provider side step to step 404 of FIG. 4. The service provider may receive user specified preference such as a communication protocol, e.g., text, email, phone call, voicemail, instant message, etc., for sending the data access alert message.

At step 506, the service provider may detect a data access request to the user data at the database. For example, as shown in FIG. 3, various internal APIs at the service provider server, such as a payment API 323 and a profile API 322, may send a database query to the database 330 to access payment data or profile data, respectively. Such data access requests may be originated by various data requestors, such as the marketing tool 301, user login event 302, attacker 303, third party 304, database administrator 306, and/or the like.

At step 508, the service provider may send an API call to the data access alert API notifying the data access request. For example, as shown in FIG. 3, the database 330 or a database server hosting the database 330, may send an API call to the data access alert API 327. The API call may be a POST message including parameters such as the time of the data access request, the originator of the data access request, the user identifying information, the types of requested user data, the type or reasons for the data access request, and/or the like.

At step 510, the service provider may optionally deny or permit the data access request upon a user response. For example, step 510 may occur in response to step 408 in FIG.

4, at which the service provider may receive a user response via the data access API and approve or disapprove the data access request to the database when the user response indicates an approval or disapproval, respectively.

In another implementation, step 510 may be optional, as the database at the service provider server may initiate the data access alert API when the database determines that user data has been accessed. For example, if the data access request is denied by the database, e.g., due to database security protection against an unidentified data access attempt when the data requestor is unknown, the service provider may not initiate the data access alert API.

Figure 6:
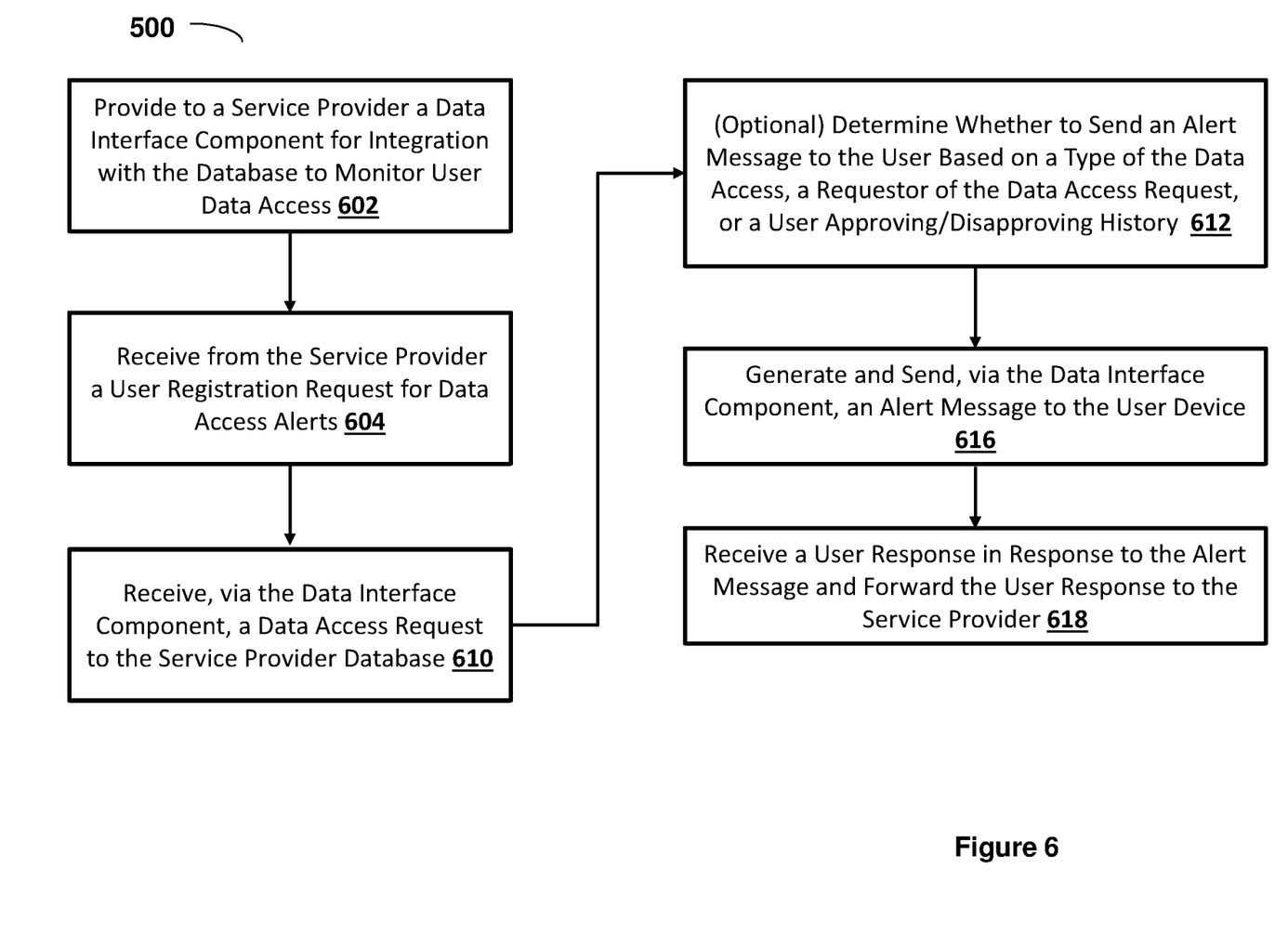
FIG. 6 is a flow diagram of an exemplary process for a data access notification server in control of a data access notification application programming interface (API) to generate and send a data access alert in response to a data access request to user data, according to an embodiment.

FIG. 6 is a flow diagram of an exemplary process for a data access notification server (such as 130 in FIG. 1 or 230 in FIG. 2) in control of a data access notification API to generate and send a data access alert in response to a data access request to user data, according to an embodiment. One or more of the processes of process 600 may be implemented, at least in part, in the form of executable code stored on non-transitory, tangible, machine-readable media that when run by one or more processors may cause the one or more processors to perform one or more of the processes. In some embodiments, process 600 may be performed by the data access notification server 130 in FIG. 1 or the data access notification server 130 in FIG. 2. It is worth noting that additional processes, steps and/or implementations may be omitted, performed in a different sequence, or combined as desired or appropriate.

At step 602, the data access notification server may provide to a service provider a data interface component for integration with the database to monitor user data access. For example, as discussed in relation to FIG. 5, the data interface component may be an API instantiated at the service provider server. In some implementations, the data access alert API is delivered and integrated at the service provider server as a set of instructions, code or functions, and acts as a remote deployment of the data access notification server. For example, the data access alert API may be called upon by the database at the service provider server when the database receives a data access request to access user data.

At step 604, the data access alert API may receive, from the service provider, a user registration request for data access alerts, and forward the user registration request to the data access notification server 130. For example, step 604 may take place in response to step 504 in FIG. 5, when the service provider receives a user registration request from the user device, e.g., via a web server of the service provider. In one implementation, the data access alert API may forward the user registration request to the data access notification server, which may in turn store a data access alert profile for the user.

At step 610, the data access alert API may receive a data access request from the database of the service provider. For example, as discussed in relation to FIG. 1, an API call may be generated to initiate the data access alert API to request an alert message to be send to the user. For instance, the data access alert API, may send a notification request including identifying information and a preferred communication protocol of a user device, to a communication API, such that the communication API may forward the notification request to a communication module to generate the data alert message. Specifically, based on a communication protocol specified in the received notification request, the communication module may compose an email, generate a text message, etc., and send the data alert message to the user device via a communication network in accordance with the communication protocol.

At step 612, the data access alert API may optionally determine whether to send an alert message to the user, e.g., in response to receiving an API call from the database notifying the data access request. In some implementations, the data access alert API may send a notification to the data access notification server, which may in turn determine whether to send an alert message to the user.

For example, in one implementation, the data access alert API, or the data access notification server may determine a type of the data access request and information relating to the data requestor of the data access request, based on which it is further determined whether to send the electronic message to the user. For instance, the type of the data access request may indicate a reason for the data access, such as user login, database management, marketing tool assistance, linking or verification at an authorized third-party service provider, unknown data request, etc. The data access alert API may determine to send an alert to the user when the data access request is an unknown data request, and may determine to refrain from sending an alert to the user to avoid excessive messaging traffic when the data access request relates to user login, database management, marketing tool assistance, linking or verification at an authorized third party service provider, etc. For another example, the data access alert API or the data access notification server may query a previously stored whitelist of authorized data requestors and determine whether the data requestor is on the whitelist. The whitelist may include data requestor from internal modules, teams, APIs of the service provider, a partnering third party service provider, user previously approved data requestors, and/or the like. When the data requestor is on the whitelist, the data access alert API may refrain from sending an alert message.

In some implementations, the data access alert API, or the data access notification server may determine that a frequency of the data access request corresponding to the user has exceeded a threshold, and then determines to generate and send an alert message to the user. For instance, when the data access alert API receives an abnormally large number of data access requests to the user data associated with the same user within a short period of time (e.g., greater than a threshold number per second, or per minute), the data access alert API may send an alert message to the user to report the suspicious activity.

In some implementations, the data access notification server, upon receiving an indication of a new data access request relating to the user from the data access alert API, may determine that the disapproval percentage of the previously received data access requests from the user response log is greater than a threshold, and then determines to generate and send an alert message to the user. For instance, when the user may previously and habitually decline data access requests, the data access alert API may be more inclined to defer to the user to decide whether a data access request is to be allowed.

At step 616, the data access alert API may generate and send the alert message to the user device. For instance, the data access alert API, may send a notification request including identifying information of a user device, to a communication API, such that the communication API may forward the notification request to a communication module to generate, e.g., to compose an email, a text message, etc., and send the data alert message to the user device. The communication module may in turn incorporate a UI element into the message according to a communication protocol, e.g., HTTP, SMTP, etc., and send the message via a communication network to the user device.

At step 618, the data access alert API, or the data access notification server may optionally receive a user response approving or disapproving the data access request and forward the response to the service provider. For example, step 618 may occur prior to step 510 in FIG. 5, where the service provider subsequently permit or deny the data access request based on the user response.

In a further implementation, the data access notification server may provide to the user device, a data interface component of a browser plugin integrated with a web application running on the user device. For example, as discussed in relation to the plugin 215 in FIG. 2, the data interface component obtains information relating to user usage of the user device from the web application and may be used to prevent access to the information relating to user usage of the user device stored with the web application. In another implementation, the data interface component, such as the plugin 215, may send the electronic message to the user device when the information relating to user usage of the user device stored with the web application is being accessed by the data requestor.

Figure 7:
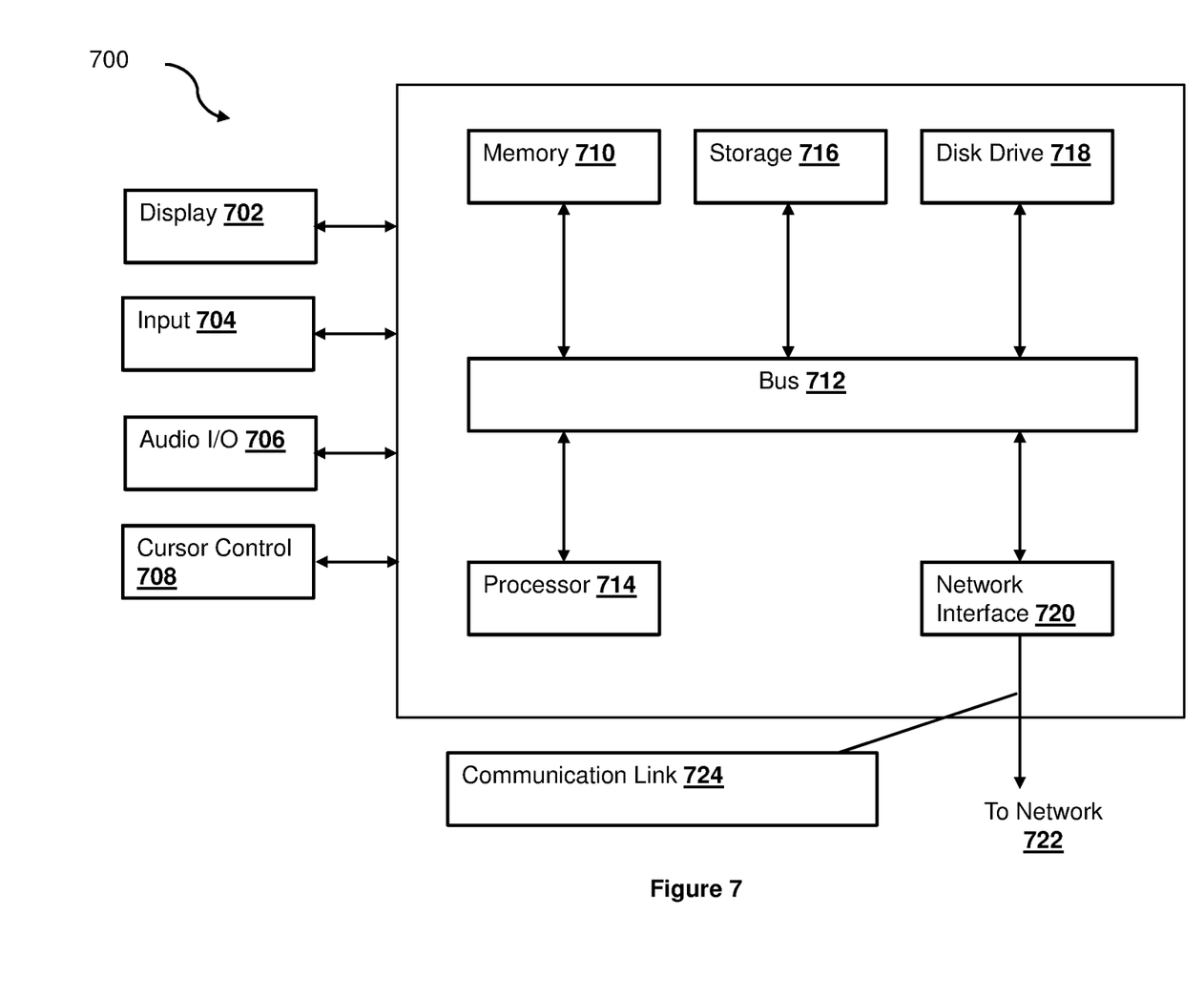
FIG. 7 is a block diagram of a computer system suitable for implementing one or more components shown in FIGS. 1-3 and performing one or more processes shown in FIGS. 4-6, according to an embodiment.

FIG. 7 is a block diagram of a computer system suitable for implementing one or more components shown in FIGS. 1-3 and performing one or more processes shown in FIGS. 4-6, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the position detection of webpage elements described herein according to the process of FIG. 3.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A method comprising:
    providing, from a server to a service provider, an application programming interface (API) for installation with a database at the service provider, wherein the database stores user data and the API serves as a data interface between the server and the service provider;
    receiving, at the server and from the API installed at the service provider, a message indicating a data access request to access user data, relating to a user, that was previously stored with the service provider,
        wherein the API generates the message indicating the data access request in response to an API call from the service provider when the service provider detects a database query at the database of the service provider for user data from a data requestor;
    determining that the user has previously registered for user data access alerts;
    generating, by the API, an electronic message indicating the data access request for user data previously stored with the service provider in response to the API call indicating a detection of the database query and determining that the user has previously registered for the user data access alerts; and
    sending, by the API and via a communication network, the electronic message to a user device associated with the user when the electronic message is generated as a response to the received message indicating the data access request from the service provider.

2. The method of claim 1, wherein the API receives an API call initiated by the service provider when the service provider detects the data access request to the user data, and wherein the API call includes a request to send the electronic message to the user device.

3. The method of claim 1, further comprising:
    determining, via the API, a type of the data access request and information relating to the data requestor of the data access request; and
    determining whether to send the electronic message based on the type of the data access request or the information relating to the data requestor.

4. The method of claim 3, wherein the generating, by the API, the electronic message indicating the data access request is further in response to determining that the data requestor is outside a white list of previously authorized data requestors.

5. The method of claim 3, wherein the generating, by the API, the electronic message indicating the data access request is further in response to determining that a frequency of the data access request corresponding to the user has exceeded a threshold.

6. The method of claim 1, wherein the generating, by the API, the electronic message indicating the data access request comprises incorporating an actionable user interface element into the electronic message, and wherein the actionable user interface element is engageable by the user to provide permission for the data access request, and the method further comprises:
    receiving, by the API and via the communication network, a user response approving the data access request; and
    sending, via the API to the service provider, the response approving the data access request.

7. The method of claim 6, further comprising:
    maintaining a user response log relating to user approval or disapproval of previously received data access requests; and
    wherein the generating, by the API, the electronic message indicating the data access request, is further in response to determining that a disapproval percentage of the previously received data access requests from the user response log is greater than a threshold.

8. The method of claim 1, further comprising:
    providing, to the user device, the API that comprises a browser plugin integrated with a web application running on the user device, wherein the API obtains information relating to user usage of the user device from the web application.

9. The method of claim 8, wherein the API is configured to perform:
    preventing access to the information relating to user usage of the user device stored with the web application; or
    sending the electronic message to the user device when the information relating to user usage of the user device stored with the web application is being accessed by the data requestor.

10. A system comprising:
    a communication interface configured to:
        provide, from a server, an application programming interface (API) to be integrated with a database at a service provider, wherein the database stores user data, and
        receive, via the API from the service provider, a user registration record that a user has registered for user data access alerts;
    a memory storing a plurality of processor-executable instructions; and
    a processor executing the plurality of processor-executable instructions to:
        receive, at the API from the service provider, an API call indicating a data access request to access user data, relating to a user, that was previously stored with the service provider when the service provider detects a database query at the database of the service provider from a data requestor,
        generate, by the API, a message indicating the data access request in response to the API call from the service provider,
        forward, by the API to the server, the message indicating the data access request; and
        send, by the API, via a communication network, an electronic message indicating the data access request, to a user device associated with the user, in response to the message indicating a detection of the database query and the message indicating the data access request.

11. The system of claim 10, wherein the processor further executes the instructions to generate the electronic message according to a user specified communication protocol in the user registration record.

12. The system of claim 10, wherein the processor further executes the instructions to determine to generate the electronic message according when the data requestor of the data access request is outside a white list of authorized requestors specified in the user registration record.

13. The system of claim 10, wherein the processor further executes the instructions to incorporate an actionable user interface element into the electronic message, and wherein the actionable user interface element is engageable by the user to provide permission for the data access request.

14. The system of claim 13, wherein the processor further executes the instructions to:
receive, via the communication network, a user response approving the data access request by engaging the actionable user interface element; and
send, to the API, the response approving the data access request;
wherein the API is configured to forward the response approving the data access request to the service provider.

15. The system of claim 10, wherein the message indicating the data access request is an API call initiated by the database at the service provider when the database detects the data access request to the user data.

16. A non-transitory processor-readable storage medium storing processor-readable instructions, the instructions being issued by a first processor at a server and being delivered to a second processor at a service provider to:
integrate an API with a database at the service provider, wherein the database stores user data;
receive, via the API and from the service provider, a message indicating a data access request to access user data, relating to a user, that was previously stored with the service provider,
forward, from the API, the message indicating the data access request to the server which determines whether the user has previously registered for the user data access alerts;
generate an electronic message indicating the data access request in response to the message indicating a detection of the database query and determining that the user has previously registered for the user data access alerts; and
send, by the API, via a communication network, the electronic message to a user device associated with the user in response to the received message indicating the data access request from the service provider.

17. The non-transitory processor-readable storage medium of claim 16, wherein the instructions include processor-executable code to build the API.

18. The non-transitory processor-readable storage medium of claim 16, wherein the instructions include processor-executable code to receive an API call initiated by the database of the service provider when the database receives the data access request from a data requestor.

19. The non-transitory processor-readable storage medium of claim 16, wherein the instructions include processor-executable code to:
receive, via the API and from the service provider, a user registration request for the user to register for user data access alerts; and
forward the user registration request to the server.

20. The non-transitory processor-readable storage medium of claim 16, wherein the instructions include processor-executable code to:
receive, by the API and via the communication network, a user response approving the data access request;
send, via the API to the service provider, the response approving the data access request; and
access a user response log relating to user approval or disapproval of previously received data access requests that is stored at the server;
wherein the sending the electronic message to a user device associated with the user is further in response to determining that a disapproval percentage of the previously received data access requests from the user response log is greater than a threshold.

* * * * *